United States Patent
Rohlfing

[19]

[11] Patent Number: 6,111,705
[45] Date of Patent: Aug. 29, 2000

[54] LIGHT EMITTING DEVICE, IN PARTICULAR A LAMP OR LANTERN

[75] Inventor: Ralph Rohlfing, Weyhe, Germany

[73] Assignee: aqua signal Aktiengesellschaft, Germany

[21] Appl. No.: 09/357,004

[22] Filed: Jul. 19, 1999

[30] Foreign Application Priority Data

Jul. 31, 1998 [DE] Germany .............................. 198 34 520

[51] Int. Cl.⁷ ...................................................... G02B 7/02
[52] U.S. Cl. ............................................................. 359/819
[58] Field of Search ...................................... 359/618, 798, 359/799, 800, 811, 819

[56] References Cited

U.S. PATENT DOCUMENTS

| | | | |
|---|---|---|---|
| 5,769,532 | 6/1998 | Sasaki | 362/237 |
| 5,905,595 | 5/1999 | Minami | 359/618 |

FOREIGN PATENT DOCUMENTS

| | | |
|---|---|---|
| 29 50 850 C2 | 7/1980 | Germany . |
| 297 08 858 U1 | 7/1997 | Germany . |
| 196 15 965 A1 | 10/1997 | Germany . |
| 1 584 690 | 2/1981 | United Kingdom . |
| WO 97/44611 | 11/1997 | WIPO . |

*Primary Examiner*—Ricky Mack
*Attorney, Agent, or Firm*—Technoprop Colton LLC

[57] ABSTRACT

The invention relates to a latern with a housing, a LED as light source and a catadioptric lens as a lens system to direct the light radiated from the light source. The light source in the housing can be adjusted relative to the lens system. The light emerges from the lens systems on all sides as a narrow strip, i.e. limited in height.

21 Claims, 5 Drawing Sheets

LIGHT EMITTING DEVICE, IN PARTICULAR A LAMP OR LANTERN

BACKGROUND OF THE INVENTION

1. Field of the Invention

The invention relates to a light-emitting device, in particular a lamp or lantern, with a housing, at least one light source and at least one lens system to direct the light radiated from the light source.

2. Description of the Related Art

Signal or marker lights are meant to radiate white or colored light preferably in a particular direction. Light shades or even lens systems are used for this purpose. For example, lanterns are used in the shipping industry, on ships or boats, and on land to mark specific conditions, direction of traffic, geographic peculiarities and many more of the like. Conventional filament or halogen lamps and other high-powered lamps are employed as the light source.

The problem of the present invention is to create a device of the type described above which can also radiate light in the required direction and intensity by using less powerful illuminating means.

BRIEF SUMMARY OF THE INVENTION

To solve this problem the device according to the invention is characterized in that the lens system has a ring-shaped or at least partially ring-shaped and circumferential light emission surface and that light issues from the lens system on all sides as a narrow strip of light, i.e. limited in height. Advantageously, the light is collected, refracted and directed by the lens system in such a manner so that practically all light entering the lens system is also completely emitted from the at least partially ring-shaped light emission surface.

The lens system employed is advantageously a rotationally symmetrical catadioptric lens with a single zone. Light enters it in an approximately axial direction and exits in an approximately radial direction.

The rays of light emitted from the light emission surface are preferably directed practically parallel to each other and in particular cophasal. To achieve this, the lens system is designed to meet the so-called eikonal condition (light beams having the same optical path length).

Particularly favorable is a point source of light from which light can be emitted with a particular cone. The light source is arranged axially in front of the lens, specifically in front of an entry plane which geometrically delimits the lens.

Advantageously, a single LED is intended for the light source. Instead of this a glass fiber or glass fiber bundle could be used which is fed by one or a plurality of LEDs or some other source of light.

To strengthen the light intensity of the device as a whole more light sources and lens systems could be coupled to one another. By arranging a light source in a housing with the lens system on top of the housing, for example, a further lens system with housing can be provided on top of the first lens system in a reciprocal arrangement. The beam positioning of the lens systems are then preferably so calculated that the light beams intersect at infinity or at the desired maximal distance, for example at a distance of two to four sea miles.

Other features of the invention can be taken from the description below and from the claims. Exemplary embodiments are described in more detail below with the help of drawings, which show:

DETAILED DESCRIPTION OF THE PREFERRED EMBODIMENTS

Figure 1:
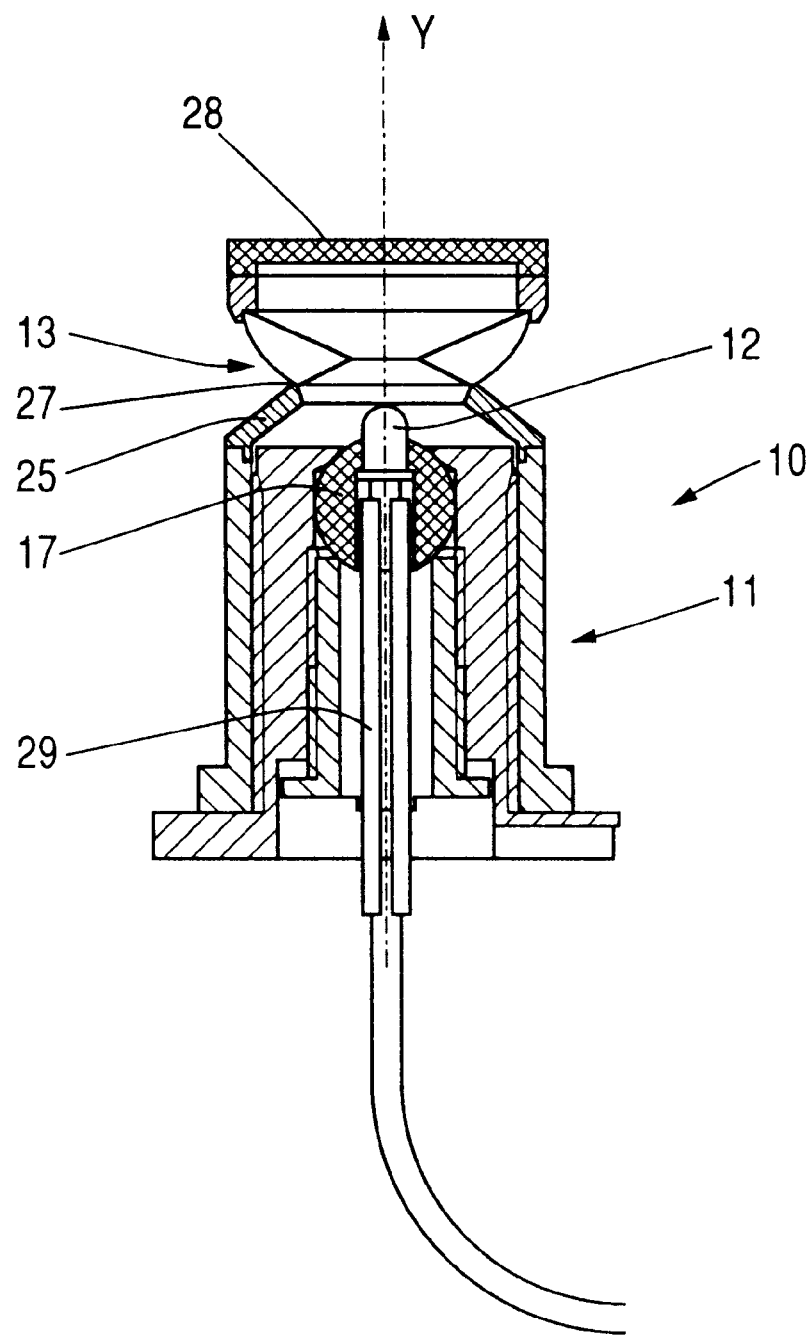
FIG. 1 a cross-sectional view of a lantern according to the invention.
Figure 2:
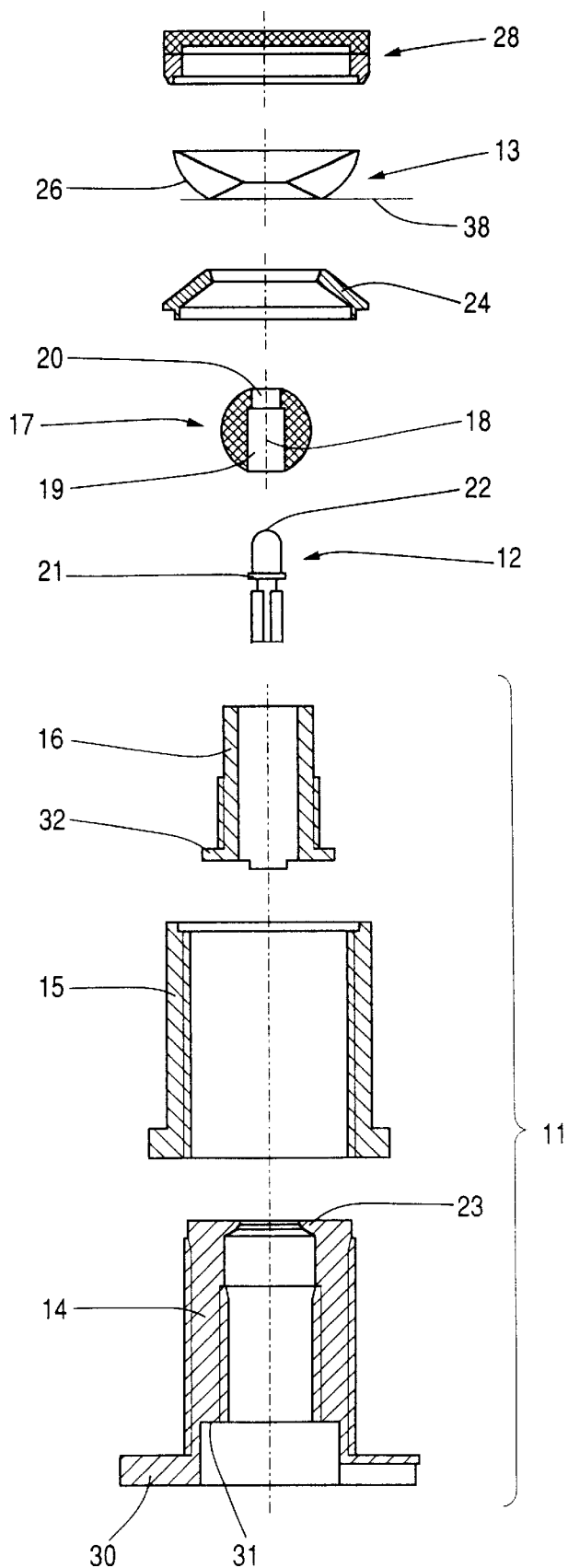
FIG. 2 an exploded view of the lantern according to FIG. 1.

Reference shall first be made to FIGS. 1 and 2. A lantern 10 has a housing 11, a practically point source of light 12 and a lens system 13. The housing has a mounting each for the lens system 13 and the light source 12, it being possible to move and adjust the mountings with respect to each other. The specific shape of the housing is that of a pipe or sleeve with a middle sleeve 14, an outer sleeve 15 and an inner sleeve 16. These are nested into each other and open at both ends. Assigned to one end is the light source 12. This is designed as a single LED and is mounted displaceably and can be locked in place in a receptacle 12. Arranged in the axial direction in front of the receptacle 12 is the lens system 13. Light from the light source 12 enters it coming in the axial direction or with a certain entry cone and exits in the radial direction.

The receptacle 17 is designed as a ball with a centered continuous bore hole 18 in which the light source 12 is seated. Light can be radiated in the axial direction and with a cone of preferably 90°, and a maximum of 120°. The bore hole is stepped, having a section 19 of greater diameter and a shorter section 20 of smaller diameter. The light source 12 (a socket or housing) likewise exhibits varying diameters and has a corresponding shoulder 21 which abuts at the transition between sections 19 and 20. A curved light emission surface 22 of the light source 12 projects out of the spherical-shaped receptacle 17.

The receptacle 17 is held in place by being clamped between the inner sleeve 16 and the middle sleeve 14 in the end region of the same. For this purpose the middle sleeve 14 has at its end region a tapering 23 of its cross section which is narrower than the diameter of the receptacle 17. The latter abuts the inside of the cross-sectional tapering 23 and exhibits a spherical surface. The inner sleeve 16 abuts the receptacle 17, coming to rest opposite the cross-sectional tapering 23. The inner sleeve 16 is held in the middle sleeve 14 by a corresponding thread fit. The inner sleeve 16 can therefore be screwed into the sleeve 14. This allows the position of the receptacle 17 to be loosened and in particular altered by rotating or swiveling.

The outer sleeve 15 is provided with a cage or a spherical enclosure 24. Middle sleeve 14 and outer sleeve 15 are in turn connected to each other by means of a suitable thread fit. By simply turning the two sleeves an axial displacement of the enclosure 24 relative to the middle sleeve 14 and thus to the light source 12 is possible. Enclosure 24 and light source 12 are arranged at the same end region of the sleeves.

The enclosure 24 is connected to the outer sleeve 15, for instance by adhesive force or a screw thread. Arranged on the outside of the enclosure 24 in the axial direction is the lens system, namely a catadioptric lens. This can be affixed to the enclosure by any appropriate means, such as adhesive force. The size of the enclosure is 24 is adapted to the geometric shape of the lens system 13. A circumferential constriction 27 is formed between a tapering cone surface 25 of the enclosure 24 and a circumferential light emission surface 26 of the lens system 13.

Provided opposite the light source 12 is the lens system 13 with a cover 28. This prevents light from emerging from the lens system in the axial direction. The cover can in turn be connected to the lens system in an appropriate manner, for instance by adhesive force. A holding device (not shown) can also be used to hold together the cover 28, the lens system 13, the enclosure 24 and the housing 11.

The sleeve form of the structural components 14, 15 and 16 is particularly advantageous because electric leads 29 for the light source 12 can be led through them in the axial direction. The middle sleeve 14 has a shoulder or stage 30 running around the end opposite the cross-sectional tapering 23. The corresponding end region of the outer sleeve 15 rests on this. At the same time, a step 31 is provided on the inner side of the stage 30 onto which a circumferential stage 32 of the inner sleeve 16 can abut at best.

Figure 3:
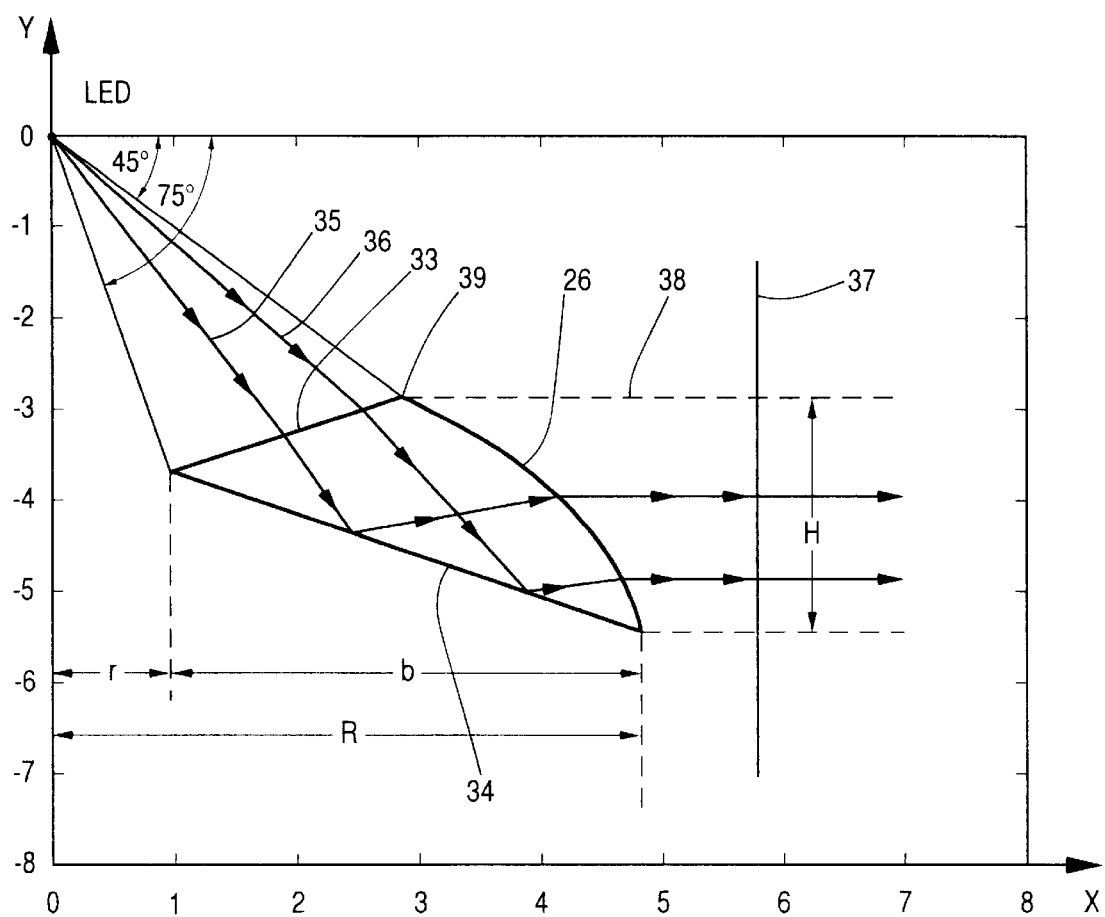
FIG. 3 a sketch for demonstrating the optic beam positioning.

FIG. 3 illustrates how light is directed by the lens system 13. On an axial cross section through the ring-shaped lens of the lens system 13 is shown here. The complete shape of the lens can be created by rotating the cross section around the y-axis.

It is assumed that a LED (light source 12) is arranged at the origin of the coordinates. Light is beamed downward in a cone of 90° (the exact opposite of what is shown in FIG. 1). The lens section shown in FIG. 3 can also be designated as a prism element having a light admission surface 33, a reflection surface 34 and the light emission surface 26. The light admission surface 33 gathers light over an angle range of 45° to 70°, in terms of the entire lens this corresponds to a light uptake in a cone-shaped area between 30° and 90°. The following might considered realistic specifications of the dimensions involved:

| lens thickness | 8 mm |
| outer radius R | 15.2084 mm |
| inner radius r | 3.1081 mm |
| difference R − r = b | 12.1004 mm |

(Errors in rounding out may have resulted in irregularities in calculation.)

The angular positions of the flat light admission surface 33 and the flat reflection surface 34 as well as of the convex curvature of the light emission surface 26 have been selected so that the so-called eikonal condition is met. After leaving the lens, the light beams should all have transversed the same optical path in terms of the reference plane behind the lens and thus be in phase. Here the optical path length is designated as being the product of the refractive index and the geometric path length. The refractive index naturally depends on the lens material. This can be glass, pressed glass, plastic or another transparent material which can be formed with the required precision. For example, one suitable material for the lens is polycarbonate. Shown in FIG. 3 are two light beams 35 and 36. These should transverse the same optical paths until they impinge a vertical reference plane 37. Here it is also important that total reflection takes place on the reflection surface 34.

The numbers specified at the vertical y-axis and the horizontal x-axis are non-dimensional and merely state the ratio of dimensions. The light admission surface 33 is tilted with respect to the x-axis toward the middle of the lens (y-axis) with increasing distance to the horizontal from the origin of the coordinates (LED).

Also important for practical application is a so-called entering plane 38. This lies exactly in the plane of an circumferential edge 39, at the transition between the light admission surface 33 and the light emission surface 26. The enclosure 24 abuts the lens system 13 or the lens in the region of the entering surface 38. In terms of the lens system, the light source is arranged outside of the entering plane 38 and at a slight distance from the same. The exact distance is determined by the existing angle of light radiation.

With the described lantern a single LED is capable of generating a narrow band of circumferential light which is still visible at a great distance. This is achieved by the precise deflection and the parallel directing of the light beam, in particular by observing the eikonal condition. The receiving aperture is preferably two $\pi$. In accordance with the parallel beam course of the radiated light, the radiation aperture is 0.

Figure 4:
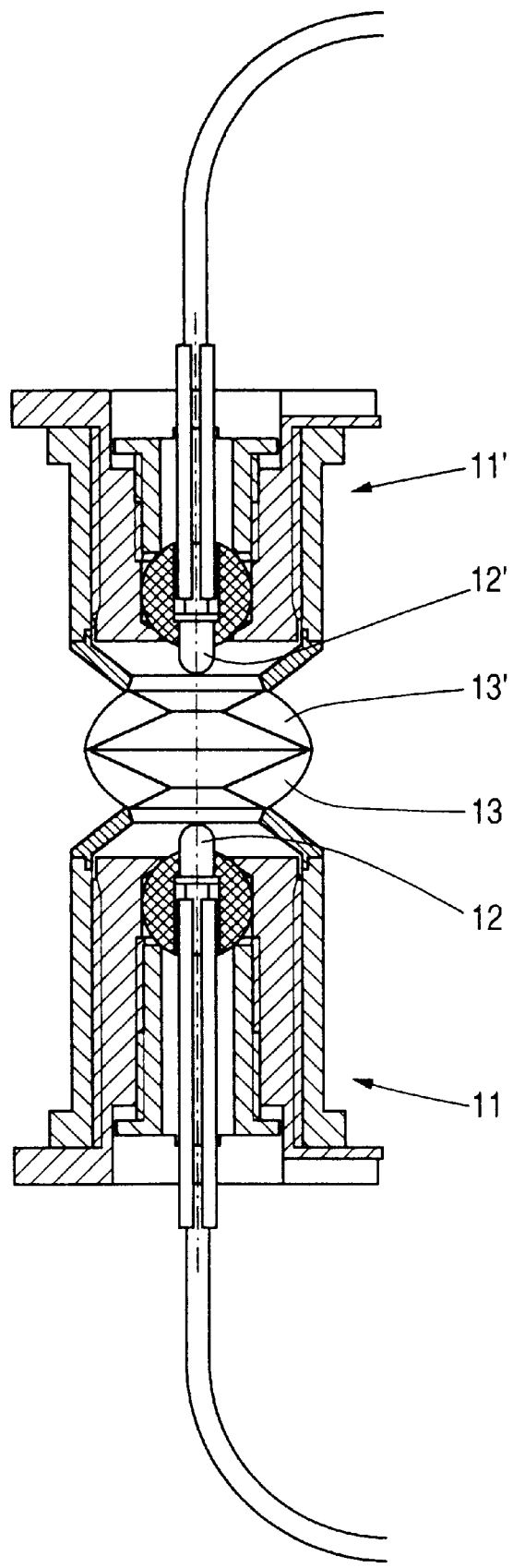
FIG. 4 a cross-sectional view of a lantern according to the invention having two light sources, FIG. 5 a glass fiber system for conducting light from a plurality of point sources of light to a common, practically point-shaped emission of light.

FIG. 4 shows a special embodiment having two lens systems 13, 13' facing each other, with the corresponding facing light sources 12, 12' and housings 11, 11'. The cover 28 can be omitted. Appropriate connecting means are not shown. The described coupling of two lantern elements results in a lamp with doubled light emission surface and doubled light intensity.

Figure 5:
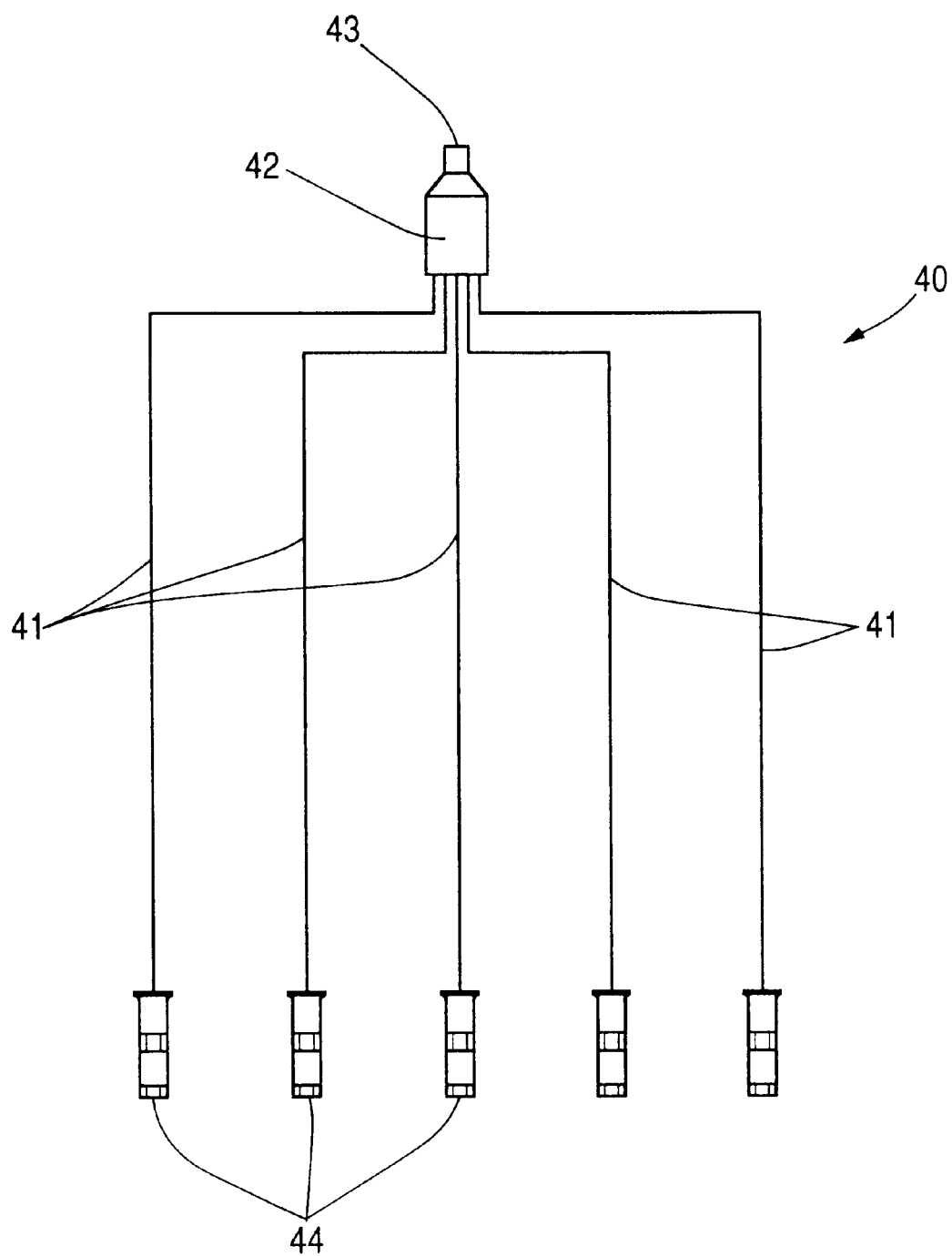

The LED specified as the light source can be replaced by any other point light source having the suitable angle of radiation. According to FIG. 5, for example, a glass fiber 40 system is provided for. This has either individual glass fibers 41 or glass fiber bundles whose ends are brought together in a common end sleeve 42. This has a light emission surface 43 which acts like a point light source. End sleeves 44 are also arranged at the other ends of the glass fibers 41. These receive light from appropriate light sources, for example from a plurality of specially protected LEDs. With the aid of the glass fiber system 40, it is possible to feed a substantially more powerful light source into the lantern 10. The glass fibers 41 can be led through the sleeves 14, 15 and 16 instead of the electric leads 29.

| List of designations | |
| --- | --- |
| 10 | lantern |
| 11 | housing |
| 12 | light source |
| 13 | lens system |
| 14 | middle sleeve |
| 15 | outer sleeve |
| 16 | inner sleeve |
| 17 | receptacle |
| 18 | bore hole |
| 19 | section |
| 20 | section |
| 21 | shoulder |
| 22 | light emission surface |
| 23 | cross-sectional tapering |
| 24 | enclosure |
| 25 | cone surface |
| 26 | light emission surface |
| 27 | constriction |
| 28 | cover |
| 29 | electric leads |
| 30 | stage |
| 31 | step |
| 32 | stage |
| 33 | light admission surface |
| 34 | reflection surface |
| 35 | light beam |
| 36 | light beam |
| 37 | reference plane |

-continued

| List of designations | |
|---|---|
| 38 | entering plane |
| 39 | edge |
| 40 | glass fiber system |
| 41 | glass fibers |
| 42 | end sleeve |
| 43 | light emission surface |
| 44 | end sleeves |

What is claimed is:

1. Light-emitting device, comprising a housing (11), at least one light source (12) and at least one lens system (13) to direct the light radiated by the light source, characterized in that the lens system (13) has a catadioptric lens with a zone which exhibits a light admission surface (33), a reflection surface (34) and a light emission surface (26), with the light emission surface (26) having a ring-shaped or at least partially ring-shaped circumferential configuration and that the light issues from the lens system (13) on all sides as a strip of light having a limited height.

2. Device according to claim 1, characterized in that the light-emitting device is selected from the group consisting of lamps and lanterns.

3. Device according to claim 1, characterized in that the light beams (35, 36) passing through the lens system (13) are eikonal.

4. Device according to claim 1, characterized in that the light source (12) is at least one LED.

5. Device according to claim 1, characterized in that the light source (12) is a light emission surface (43) of a glass fiber bundle or a transfer lens system fed by glass fibers.

6. Device according to claim 1, characterized in that the distance between light source (12) and lens system (13) is variable.

7. Device according to claim 6, characterized in that light source (12) and lens system (13) are assigned to different sleeves (14, 15) which are displaceable relative to each other in the axial direction.

8. Device according to claim 1, characterized in that the light source (12) relative to the lens system (13).

9. Device according to claim 8, characterized in that the light source (12) is arranged near the spherical surface of a receptacle (17) and swivels with the latter.

10. Device according to claim 9, characterized in that the receptacle (17) is a ball with a centered bore hole (18) in which the light source is seated (12), with a lead (29) for the light source (12) passing through the bore hole (18), the light source (12) projecting above the ball surface and it being possible to lock the receptacle (17) in the housing (11) by exerting pressure.

11. Device according to claim 9, characterized in that the receptacle (17) is a ball which abuts an inner edge (23) inside a sleeve (14) and can be pressure-impacted by an inner sleeve (16) opposite the inner edge.

12. Device according to claim 1, characterized in that the lens system (13) is held on a circumferential edge (24) of a sleeve, in particular of the outer sleeve (15), in such a way that light—in terms of the sleeve—enters the lens system (12) axially or as an open cone and emerges from the lens system approximately radially.

13. Device according to claim 1, characterized in that the light source (12) rotates relative to the lens system (13).

14. Device according to claim 1, characterized in that the light source (12) pivots and rotates relative to the lens system (13).

15. Device according to claim 14, characterized in that the light source (12) is arranged near the spherical surface of a receptacle (17) and rotates with the latter.

16. Device according to claim 14, characterized in that the light source (12) is arranged near the spherical surface of a receptacle (17) and swivels and rotates with the latter.

17. Device according to claim 1, characterized in that the light source (12) is adjustable relative to the lens system (13).

18. Device according to claim 17, characterized in that the light source (12) is arranged near the spherical surface of a receptacle (17) and is adjustable relative to the receptacle.

19. Light-emitting device comprising a housing (11), at least one light source (12) and at least one lens system (13) to direct light radiated by the light source (12), characterized in that:

a. the lens system (13) comprises a catadioptric lens with a light admission surface (33), a reflection surface (34) and a ring-shaped or at least partially ring-shaped circumferential light emission surface (26);
   b. the lens system (13) further defines an optic axis;
   c. light coming from the light source (12) enters the lens system (13) approximately axially with respect to the optic axis or as an open cone; and
   d. the light emerges from the lens system (13) with respect to the optic axis in an approximately radial direction.

20. Device according to claim 19, characterized in that the light emerges from the lens system as a strip of light having a limited height in the axial direction.

21. Device according to claim 19, characterized in that the optical axis is aligned vertically and the light emerges from the ring-shaped lens is aligned horizontally by the lens system.

* * * * *